March 31, 1964  C. M. HAYWARD  3,127,576
D.C. TO A.C. CONVERTER WITH NEGATIVE FEEDBACK STABILIZATION
Filed Feb. 9, 1962  2 Sheets-Sheet 1

INVENTOR.
C. MICHAEL HAYWARD

Weingarten, Drewlach & Pandiscio
Attys.

March 31, 1964  C. M. HAYWARD  3,127,576
D.C. TO A.C. CONVERTER WITH NEGATIVE FEEDBACK STABILIZATION
Filed Feb. 9, 1962  2 Sheets-Sheet 2

INVENTOR.
C. MICHAEL HAYWARD

United States Patent Office 3,127,576
Patented Mar. 31, 1964

3,127,576
D.C. TO A.C. CONVERTER WITH NEGATIVE
FEEDBACK STABILIZATION
Charles Michael Hayward, Brockton, Mass., assignor to
Epsco, Incorporated, Cambridge, Mass., a corporation
of Massachusetts
Filed Feb. 9, 1962, Ser. No. 172,197
8 Claims. (Cl. 331—113)

This invention relates to the conversion of direct current power to alternating current power. More particularly, the present invention relates to improvements in inverters of the type in which a pair of amplifying electronic switches is employed to alternate the transfer of a direct current across a transformer.

The present invention is concerned with inverters of the type known as magnetically coupled multi-vibrators intended to provide a square-wave output. For the purposes of this discussion, a square wave is considered to be a generally rectangular wave form which is maintained constant at one level for a time $T_1$, and constant at another level for a time $T_2$, and which is repetitive with a period of $T_1+T_2+2T_3$, $T_3$ being the time required for the wave form to change substantially linearly between adjacent constant levels. The more nearly $T_3$ approaches zero, the more nearly will the wave form appear rectangular. Where $T_3$ is a finite quantity of the order of magnitude of $T_1$ or $T_2$, the wave form will appear trapezoidal but is considered a square wave within the foregoing definition. Square waves are useful in many electronic applications, for instance, as timing pulses or as power carriers for transmission through inductive couplings.

In one form of the invention, the inverter is of the type known as a flux oscillator. Typically, the latter employs a pair of electronic switches, such as transistors, having their control or base inputs supplied from positive feedback loops from a pair of secondary windings of a transformer, the transformer primary being center-tapped and having that tap connected through a D.C. power source to the emitters of the switch transistors. In flux oscillators of this type the transformer is a saturable inducive element, such as one which has rectangular hysteresis or a square B-H loop. In the operation of a typical flux oscillator, the transformer flux is driven in alternate half cycles from saturation of one polarity to the other. When the transformer core saturates, the flux change in an appropriate secondary winding drops to zero and the control current on the corresponding transistor base then also drops to shut off the transistor. As the transistor turns off, an inductive kickback occurs aiding the initial turn on of the other transistor. Because of the rectangular hysteresis characteristics of the core, the winding will show low inductance at core saturation, therefore preferably limiting the kickback to a level which will not damage the transistors. An excellent discussion of oscillators of this type entitled Single Transformer Inverter can be found in the Motorola Power Transistor Handbook, First Edition, 1961, at pp. 115–116. The alternation in conduction of the transistors provides an alternating output having frequencies and amplitude largely determined by the voltage of the D.C. power source. Thus, variations in line voltage cause material changes in the oscillator output.

A principal object of the present invention is therefore to provide an improved inverter which includes means for accurately regulating inverter operation so that fairly wide variations in input D.C. voltages and output current demand do not materially affect the frequencies, wave form, or amplitude of the output. In the preferred form of the present invention such a regulating means comprises means for maintaining a discrete signal level at the control inputs of the electronic switches so as to accurately control the maximum conduction of the latter during their "on" conditions. Such a means takes the form of a degenerative circuit or negative feed-back loop associated with each amplifying electronic switch.

The present invention also finds application in magnetic coupled multi-vibrators wherein the transformer core exhibits standard or non-square hysteresis characteristics. It should be noted that in flux oscillators of the type hereinbefore described, the electronic switches are turned to their "off" states by the decay of the control signal due to core saturation. Because this will not occur in oscillators having a standard transformer core, the feed-back circuits, both regenerative and degenerative, of the present inventions also include means for switching the transistors alternately to their respective non-conductive states. In one form, the latter means incorporates means for controlling the decay or rise times of the control signals and therefore provides a trapezoidal type of square wave. It is often desirable to produce a carefully regulated trapezoidal wave because the latter contains considerably less harmonic content than a rectilinear wave form and therefore offers less shielding problems when employed as a power carrier through inductive couplings.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing wherein.

Figure 1:
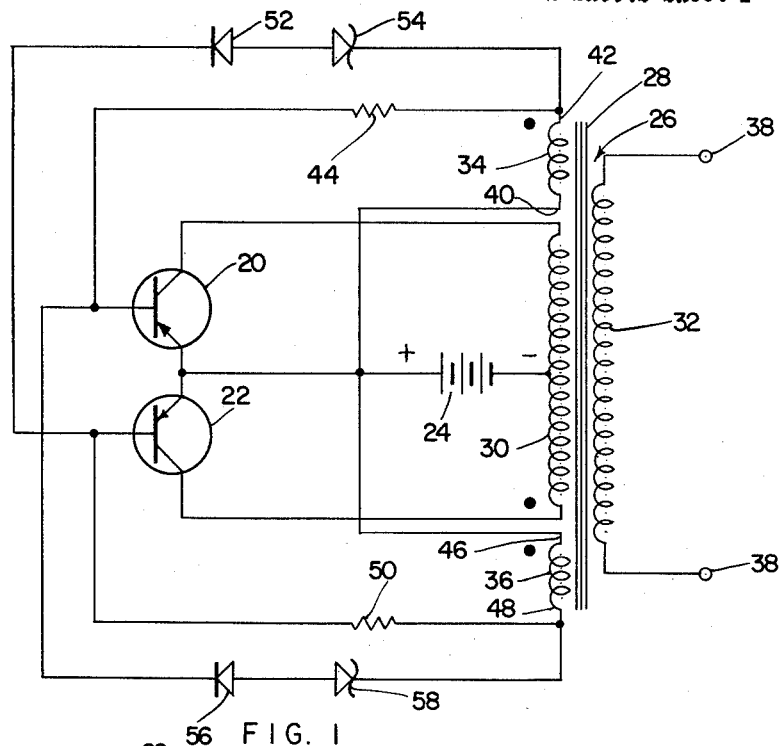
FIGURE 1 is a schematic circuit digaram of one oscillator embodying the principles of the present invention.

Referring now to FIGURE 1, there will be seen a circuit diagram of an inverter embodying the principles of the present invention. This inverter is in the form of a flux oscillator comprising a pair of amplifying electronic switches such as pnp, alloy junction transistors 20 and 22. Each transistor has the usual base, collector and emitter electrodes. In the form shown, the emitters of each transistors are tied together and are also connected to a positive D.C. potential source such as battery 24. The invention also includes an inductive coupling device such as transformer 26 having a magnetizable core 28. The latter is formed of material which exhibits substantially square loop hysteresis characteristics. Typically, such cores are formed of materials such as a 50% nickel iron which is grain oriented. Other core materials and transformer devices of this type are well known in the art. Transformer 26 includes a primary winding 30 and a secondary winding of three sections, center section 32 and end sections 34 and 36. Secondary center section 32 of the transformer is adapted to have a load placed across its output terminals 38. Primary winding 30 is center-tapped to a negative potential such as the negative terminal of battery 24.

Secondary winding sections 34 and 36 preferably have the same number of turns. A first side 40 of secondary section 34 is connected to the transistor emitters. The other side 42 of secondary section 34 is connected to the base of transistor 20 through series resistor 44, thereby forming a regenerative feed-back loop for driving the base of transistor 20. Similarly, one side 46 of secondary section 36 is also connected to the transistor emitters, while the other side 48 of section 36 is connected to the base of transistor 22 through series resistor 50 to form a regenerative feed-back loop feeding the base of transistor 22.

The invention includes a pair of negative or degenerative feed-back loops respectively for the transistor bases. In the form shown, one of these degenerative loops comprises a uni-directional current conducting device, such as diode 52, in series with a controllably reversible, uni-directional current conducting device, such as Zener diode 54. These diodes are connected between the base of transistor 22 and end 42 of secondary section 34 and are poled so that electron conduction in the loop, when allowed by Zener 54, can only occur in a direction from the transistor base to secondary section 34. The other degenerative feed-back loop comprises a similar combination of diode 56 and Zener diode 58 inserted in series between the base of transistor 28 and end 48 of secondary section 36, being also poled to prevent electron conduction except when allowed by Zener diode 58 in a direction from the transistor base to secondary 36. As shown by the dots adjacent the ends of the pertinent transformer windings, in accordance with conventional practice, the relative directions of the turns of the windings are such that the dots indicate the negative potentials at a particular time, i.e., the phasing of the windings.

In operation, inherent imbalance due to minute variations in the circuit parameters usually is sufficient to start the operation. Assuming that the base of transistor 20 is biased to allow some conduction through the latter, the emitter-base current then pulled drives the collector of transistor 20 less negative, thereby increasing the emitter-collector current drawn. This serves to increase the voltage induced in secondary section 34 and builds up the base current regeneratively through the operation of the positive feed-back loop comprising resistor 44. As the base of transistor 20 goes more negative, because of the phasing of winding of the sections of the transformer secondary the voltage induced in section 36 biases the base of transistor 22 for maintaining the latter in a non-conductive condition. As the voltage across winding section 36 builds up, it ultimately exceeds the potential necessary to fire Zener diode 58. This potential is the sum of the Zener voltage and the potential drop across diode 56 less the base-emitter potential of transistor 20. Diode 56, of course, effectively prevents Zener diode 58 from conducting in a direction opposite to the Zener breakdown direction during one-half cycle. When Zener diode 58 fires, the voltage across secondary section 36 is then maintained at a constant value because the operation of the Zener diode closes the negative feed-back loop which has a much higher loop gain than that of the regenerative loop feeding base 20. This is because the dynamic impedance of the Zener diode is much lower than the resistance of resistor 44 which supplied the positive feed-back. The voltage across secondary 36 is now maintained at a constant value; all of the other windings of course, are similarly clamped at a fixed potential, and some of the current supplied by resistor 44 to base 20 is shunted through the negative feed-back loop, thereby automatically regulating the variations in load current, in line voltage, the terminal transistor effects and transformer effects, and the like. Transistor 20 is so chosen that for a given circuit it does not saturate at the constant voltage level maintained across section 36.

Figure 2:
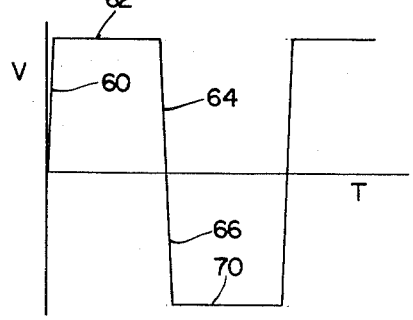
FIGURE 2 is a wave form diagram of a voltage-time relationship of the operation of the embodiment of FIGURE 1.

The increase in voltage, reflected across terminals 38 according to the turns ratio of transformer 36 and due to the rapid increase in conduction through transistor 20 as the base of the latter is driven more negative, is shown graphically as section 60 of the wave-form of FIGURE 2. It should be noted that the increase in voltage is extremely fast, i.e., the rise time is very short. When the voltage has reached a value at which Zener 58 breaks down and conducts the voltage is clamped at a constant level shown as portion 62 of the wave-form of FIGURE 2. The voltage will remain at this level, controlled by the degenerative effects of the feed-back loop including Zener diode 58.

Figure 3:
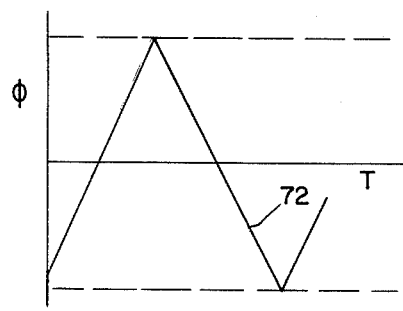
FIGURE 3 is a wave form diagram of a flux-time relationship of the embodiment of FIGURE 1 on the same time axis as FIGURE 2.

It should be noted that the voltage induced in the secondary is proportional to the rate of change of flux in the latter. Hence, when the voltage is constant, the rate of change of flux is constant as may be seen from the linear aspects of the flux-time curve of FIGURE 3 during the time occupied by portion 62 of the wave-form of FIGURE 2. When the total flux in the transformer core reaches one of the saturation levels indicated in FIGURE 3 as broken lines, the rate of change in flux becomes zero and the voltage induced thereby immediately ceases as may be seen in portion 64 of the wave-form of FIGURE 2. The voltage across terminals 38 thereby precipitously drops from the level at which it was maintained by Zener 58 to a no-voltage condition indicated by the base line of FIGURE 2. Simultaneously, because a potential no longer exists across winding 34, the base current to transistor 20 ceases, placing the latter in a non-conductive condition, effectively switching off the transistor.

The switching of transistor 20 to an "off" condition, however, because of the inductiveness of winding 34, induces a kick-back which drives the transformer in an opposite direction presenting an inverse polarity across terminals 38. The kick-back also serves to negatively bias the base of transistor 22 because of the reversal of voltage across secondary section 36, causing transistor 22 to assume an initial conductive condition. In the same manner previously described in connection with transistor 20, the conductive condition of transistor 22 rapidly builds up due to the regenerative effect of the feed-back loop through resistor 50 from secondary section 36. This inversion of the voltage polarity and rapid build-up is shown as section 66 in the wave-form of FIGURE 2. Simultaneously, of course, the voltage across secondary section 34 also has reversed, thereby maintaining transistor 20 in its non-conductive state. As the voltage across the secondary continues to increase in the opposite direction it will finally exceed the voltage across secondary section 34 and accurately regulate the base current to transistor 22. The constant voltage thereby maintained across secondary section 34 and reflected across terminals 38 is shown as portion 70 of the wave-form of FIGURE 2. The reversal of the flux due to the rectangular characteristics of the flux core during the transistion time between constant voltage levels of opposite polarities and the time that the voltage is held constant at the reverse level (as seen in FIGURE 2) is shown graphically as portion 72 in FIGURE 3. When the flux in the transformer core has changed to a value at which the opposite saturation level is reached, the transformer voltages again will rapidly decay to zero, reversing the voltage output.

It should be noted that the amplitude of the voltage wave-form thus produced is thus accurately controlled by the Zener diodes in the loops, and the constancy of the frequency is maintained by the transformer core characteristics. Thus, changes in other parameters, such as line voltage variations will be automatically compensated for by the operation of the Zener diodes and the alternating output across terminals 38 is a very accurately regulated square wave.

Figure 4:
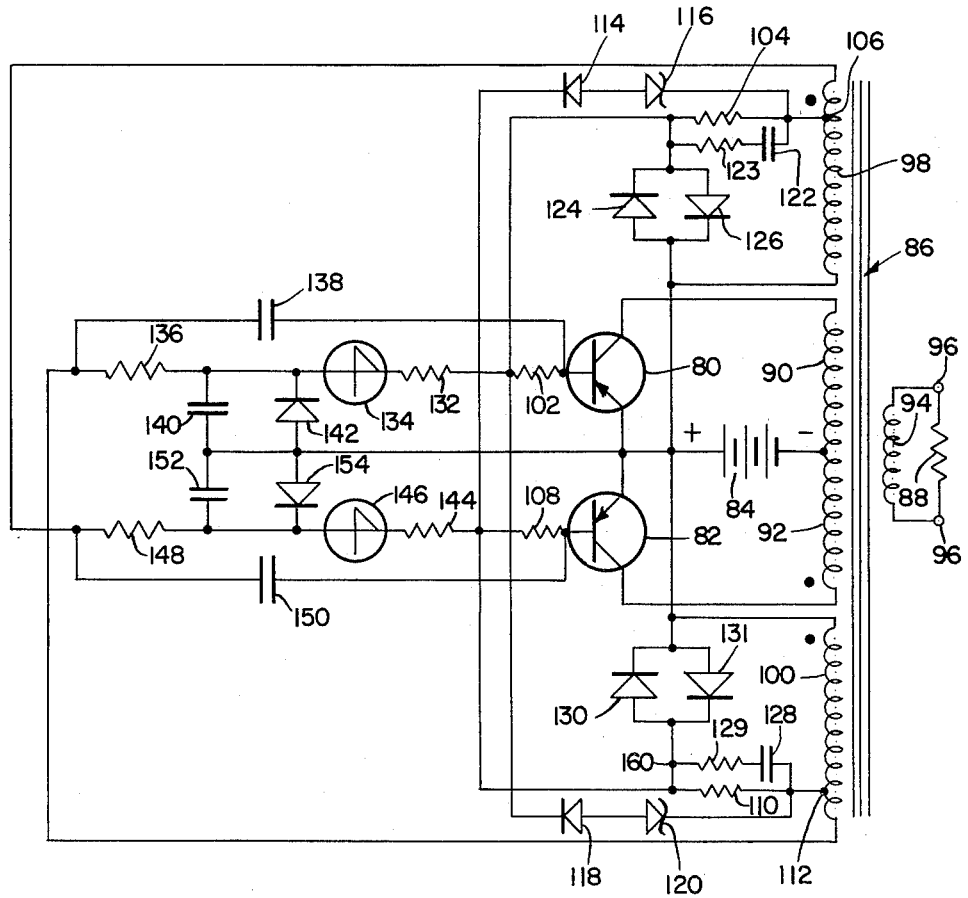
FIGURE 4 is a schematic circuit diagram of yet another oscillator embodying the principles of the present invention.

Referring now to FIGURE 4 there will be seen a schematic circuit diagram of another device or oscillator embodying the principles of the present invention. The oscillator of FIGURE 4 includes a pair of amplifying electronic switches such as transistors 80 and 82, each of which has the usual base, collector and emitter electrodes. As in the embodiment of FIGURE 1, the emitters of transistors 80 and 82 are tied together to "ground" which is the positive terminal of a D.C. potential source, for instance, battery 84. The circuit also includes means, such as transformer 86, for inductively coupling the oscillator output to a load such as impedance 88. The preferred form of transformer 86, for the circuit shown, has a magnetizable core which exhibits "normal" or non-rectangular hysteresis characteristics. Transformer 86 includes a primary winding which, for the sake of clarity in exposition, is formed of first section 90 and second section 92. The transformer also comprises a three-part secondary, the parts being shown as center section 94 adapted to have load 88 placed across its output terminals 96, and two end windings 98 and 100. As may be seen, the primary winding is center-tapped between sections 90 and 92 to the negative terminal of battery 84.

Because the oscillator of FIGURE 4 is a symmetrical device in which the output is provided by the alternate conduction of transistors 80 and 82, windings 98 and 100 each preferably has the same number of turns as the other. One side of winding 98 is connected to the transistor emitters, as is one side of winding 100. The base of transistor 80 is connected through a pair of series resistors 102 and 104 to a point 106 adjacent the opposite end of winding 98, forming a regenerative feed-back loop for driving the base of transistor 80. Similarly, the base of transistor 82 is connected through a regenerative feedback loop comprising series resistors 108 and 110 to point 112 on winding 100 adjacent the opposite end of the latter.

The embodiment of FIGURE 4, as does that of FIGURE 1, comprises a pair of negative or degenerative feedback loops respectively coupled to the bases of the transistors. In the form shown, one degenerative loop comprises series connected diode 114 and Zener diode 116 coupling the base of transistor 82 to point 106 of winding 98, and the other degenerative loop comprises diode 118 and Zener diode 120 in series coupling the base of transistor 80 to point 112 of winding 100. The poling of the conventional diode and Zener diode pairs is each degenerative feed-back loop as has been previously described in connection with the embodiment of FIGURE 1. The circuit of FIGURE 4, as thus far described, is substantially identical to that of FIGURE 1 with the exception of the characteristics of the transformer core and the provision of a pair of series resistors rather than a single resistor in each positive feed-back loop. The reason for the dual resistor feed-back loop construction will become apparent hereinafter.

While the device of FIGURE 1 provides an excellent, stabilized, square-wave output, the embodiment of FIGURE 4 is intended to provide a periodic trapezoidal wave form at its output, and as described can no longer depend upon the transformer core characteristics to provide flux saturation serving to shut off conduction in the transistors. Consequently, the present invention includes a means for modifying the slope of the leading edge of a half cycle of the output wave form so that the leading edge assumes a substantially linear ramp form having a controlled slope. Similarly, this embodiment of the invention also includes means independent of the core material of the transformer for turning off the transistors so as to modify the trailing edge of the appropriate half cycle of the wave form so that the trailing edge is also a substantially linear ramp of controlled slope.

As means for modifying the leading edge of a half-cycle of the wave form of the output of the oscillator there is provided circuitry primarily for controlling the operation of the positive feed-back loops feeding the transistor base, thereby introducing a substantially linear ramp into the transistor "turn-on." The positive feed-back loop coupled to the base of transistor 80 includes series resistors 104 and 102 and in the preferred embodiment, the resistance of resistor 104 is considerably greater than that of resistor 102. A capacitance 122 and an associated series resistor 123 are coupled in parallel across resistor 104 and therefore in series with resistor 102, and a pair of parallel diodes 124 and 126 are placed in opposite polarity to one another between "ground" to a point intermediate resistors 102 and 104. The positive feed-back loop feeding the base of transistor 82 incorporates similar circuitry in the form of capacitor 128 and series resistor 129 which are in parallel with resistor 110 and in series with resistor 108, and another pair of parallel diodes 130 and 131 in opposite polarities coupling "ground" to a point intermediate resistors 110 and 108. Resistor 110 also possesses a considerably greater resistance than its companion series resistor 108.

As means for turning the respective transistors off and for forming a ramp type trailing edge of a half cycle of the wave form of the output, there is provided additional circuitry connected to the bases of the transistors. In the form shown, this circuitry includes a first loop coupling the base of transistor 80 through series resistor 102 and other components to the extremity of winding 100 adjacent point 112. The first loop includes in series, resistance 132, Shockley diode 134 and resistance 136. Across the latter three elements there is parallel capacitance 138. A Shockley diode is the tradename for a four-layer diode which is a two-terminal, silicon, semi-conductor switch having two step-states. The "on" or low impedance state is achieved by imposing a voltage level or break-over voltage across the switch terminals in excess of a predetermined switching voltage level. The diode remains "on" until switched to an "off" or high impedance state by reducing the current flowing through the device to a point below a predetermined holding current level. Such diodes are commercially available from and are described in the literature of the Clevite Corporation. A point intermediate resistor 136 and Shockley diode 134 is connected to "ground" through a capacitance 140 and diode 142 which are in parallel to one another, the diode being poled to prevent a reverse bias across Shockley diode 134. A second loop is provided connecting the base of transistor 82 through series resistor 108 to the end of winding 98 which is adjacent point 106. The elements of this second loop are similar to those of the first loop in that the second loop includes series resistor 144, Shockley diode 146, and resistor 148, these latter three elements also being by-passed by parallel capacitance 150. A point intermediate Shockley diode 146 and resistor 148 is connected to "ground" through capacitance 152 and diode 154 in parallel. Diode 154 also is posed to prevent reverse bias across Shockley diode 146.

In describing the operation of the embodiment of FIGURE 4, it is most convenient to consider the operation starting at a time when transistor 80 is conducting and transistor 82, of course, is in its "off" condition. Due to the collector-emitter current then passing through transistor 80, the field induced in first section 90 of the primary winding induces a current in end winding 98. In accordance with accepted practice, the dots adjacent the ends of the various transformer windings indicate the phasing thereof. As the end of winding 98 adjacent point 106 goes more negative, the current fed to the base of transistor 80 through resistors 104 and 102 regeneratively builds up increasing the conduction through transistor 80. Simultaneously, the end of winding 100 adjacent point 112 is driven more positive and as the phase of this point is the same as that of the collector of transistor 80, capacitor 138 acts as an integrating capacitor. Also, the current from winding 100 is charging capacitor 140 through resistor 136 in a positive direction. When the voltage at point 112 extends the potential necessary to fire Zener diode 120, the latter breaks down and conducts. The degenerative feed-back due to conduction through Zener 120 and diode 118 then maintains the voltage across all of the windings at a constant value for the same reasons heretofore described in connection with the embodiment of FIGURE 1. However, the charge on capacitor 140 lags behind the build up of voltage at point 112. When the voltage across capacitor 140 does reach the break-over voltage of Shockley diode 134, the voltage across this diode collapses and the Shockley diode goes into its "on" or low impedance state. Consequently, the charge on capacitor 140 is dumped through resistors 132 and 102, and being a positive charge, tends to remove the current from the base of transistor 80. The values of capacitor 140 and resistors 132 are so chosen that the initial current flowing through resistor 132 exceeds the total current that can be supplied through resistor 104, and thus would tend to turn off transsistor 80 very quickly. However, capacitor 138 acts as an integrating capacitor, e.g., as if it were connected across the base-to-collector junction of transistor 80. The charge on capacitor 138 therefore supplies an exponential decaying current which slows the turn-off of transistor 80. While transistor 80 is conducting, the magnetizing current of winding 90 increases linearly. When the current taken by transistor 80 equals the magnetizing current in winding 90, a no-voltage condition exists across load winding 94, there being no current available to flow through the latter. Therefore, as transistor 80 continues to cut off, it can no longer supply the magnetizing current required by winding 90, and the flow of magnetizing current continues through the load, reversing the voltage phase across the transformer windings. This reversal of voltage tends to initiate the turn on of transistor 82 by supplying base current to the latter through the positive feed-back loop comprising resistor 110 and resistor 108.

While transistor 80 is conducting, point 112 is at a positive potential; as transistor 80 cuts off, the potential at point 112 becomes less poistive. During peak conduction of transistor 80, the potential across capacitor 128 was held constant. Now as point 112 goes less positive, it tends to pull the adjacent side of capacitor 128 with it, and current starts to circulate through capacitor 128 and series resistor 129 in a direction which is opposite to that of the current then flowing through resistor 110. Resistor 129 prevents parasitic oscillations which might occur. During peak conduction of transistor 80, diode 130 had held the base of transistor 82 clamped at a low positive potential as the current flowing through resistor 110 also flows through this diode. The value of capacitor 128 is chosen so that when a reverse current starts to flow therethrough, this reversed current quickly overcomes the current flowing through resistor 110, causing the potential of the base of transistor 82 to go negtaive. Thus, there is a rapid step input to the base of transistor 82 of a current at a negative potential which will increase until conduction through diode 131 clamps the negative potential at a substantially constant value. At this point a constant current flows through resistor 108, this current being equal to the forward voltage of diode 131 less the base-emitter voltage of transistor 82 divided by the ohmic value of resistor 108.

Because transistor 82, as is transistor 80, is selected to have a fairly high gain or beta, a large proportion of the current applied as the step input to the base of transistor 82 flows back through capacitor 150, charging the latter. This constant current flowing through capacitor 150 provides a ramp increase of the voltage across winding 98; therefore, the voltage across all other windings of transformer 86 change in the same manner. The ramp increase in voltage continues until it reaches a value at which Zener 116 breaks down and conducts. At this point, the voltage across the windings becomes clamped at a relatively constant level at which it remains controlled by the degenerative effects of the feed-back loop which includes Zener diode 116. The voltage will remain at this level until the charge on capacitor 152 reaches the break-over voltage of Shockley diode 146, causing the voltage across the latter to collapse, whereupon the Shockley diode goes into the "on" condition. Of course, while transistor 82 is in conduction, transistor 80 is held in a non-conductive state by the application of positive potential to its base, held at a low level by the diversion of current through diode 124 to ground. The remainder of the operation to complete the cycle with respect to transistor 82 is similar to that heretofore described in connection with the turn-off of transistor 80.

Since certain changes may be made in the above apparatus without departing from the scope of the invention herein involved, it is intended that all matter contained in the above description or shown in the accompanying drawings shall be interpreted as illustrative and not in a limiting sense. For example, while the present embodiment has been described as employing pnp type transistors, npn transistors could easily be substituted therefore by simply reversing the polarity of all diodes and the supply voltage. Generally, since each transistor described essentially operates as an amplifying switch, any element capable of performing in such manner may be used in practicing the invention.

What is claimed is:
1. Apparatus for converting direct current from a power source to alternating current, said apparatus comprising in combination:
   a transformer,
   a first switch having input, output and control terminals,
   a second switch having input, output and control terminals,
   means for connecting the power source between an intermediate tap on the primary winding of the transformer and the input terminals of the switches,
   means connecting both output terminals of the switches to opposite points adjacent the respective ends of said primary winding,
   means constituting a pair of positive feed-back loops connecting the respective control terminals to different points on the secondary winding of the transformer,
   means comprising a pair of negative feed-back loops connecting said respective control terminals to points on the secondary winding which are opposite in polarity to the points to which the positive feed-back loops are connected,
   the means comprising each negative feed-back loop including a uni-directional conductive device poled to prevent conduction in said loop until a predetermined voltage of appropriate polarity is exceeded across said device.

2. Apparatus as described in claim 1 wherein said transformer is of the type having a core exhibiting a substantially rectangular magnetic hysteresis characteristic.

3. Apparatus as defined in claim 1 wherein each uni-directional conductive device is a Zener diode.

4. Apparatus as defined in claim 3 wherein each of the means comprising a negative feed-back loop includes a diode connected in series with and poled oppositely to the aforesaid Zener diode.

5. Apparatus as defined in claim 4 wherein each switch is a transistor and the means constituting each positive feed-back loop includes a resistor.

6. Apparatus for converting D.C. from a source of electricity to A.C., the apparatus comprising, in combination,
   a transformer having a center-tapped primary winding and a secondary winding,
   a first switch having an input terminal, an output terminal and a control terminal,
   a second switch having an input terminal, an output terminal and a control terminal,
   means for connecting the D.C. source between the center-tap of the primary winding and the input terminals of the switches, means for connecting the respective output terminals of each of the switches to opposite ends of the primary winding, means constituting a positive feed-back loop, the feedback loop means having a resistor and connecting a point adjacent one end of a first section of the secondary winding to the control terminal of the first switch, the other end of the first section of the secondary winding being connected to the input terminal of the first switch, means constituting a second positive feed-back loop, the second loop means having a resistor and connecting one end of a second section of the secondary winding to the control terminal of the second switch, the other end of the second section of the secondary being connected to the input terminal of the second switch, means constituting a negative feed-back loop, the means including a uni-directional conductive device, and a selectively uni-directional conductive device which conducts when a predetermined voltage is exceeded across the device, the uni-directional conductive devices being connected in series, the negative feed-back loop means connecting the control terminal of the second switch with one end of the first section of the secondary, and means constituting a second negative feed-back loop, the means including a uni-directional conductive device, and a selectively uni-directional conductive device which conducts when a predetermined voltage is exceeded across the device, the conductive devices being connected in series, the second negative feed-back loop means connecting the control terminal of the first switch with said one end of the second section of the secondary.

7. Apparatus for converting direct current from a power source to alternating current, said apparatus comprising in combination:

transformer means, first amplifier switch means having input, output and control terminals, and adapted to be placed in either a conductive or a non-conductive state, second amplifier swtich means having input, output and control terminals, and adapted to be placed in either a conductive or a non-conductive state, means for connecting the power source between an intermediate point on the primary winding of said transformer means and the input terminals of both said switch means, means connecting the output terminals of both said switch means to opposite ends of said primary winding, means constituting a pair of positive feed-back loops connecting respective control terminals to the secondary winding of said transformer means for biasing said switch means alternately into their respective conductive states, means for controlling as a substantially linear function of time the biasing operation of said positive feedback loops, means constituting a pair of negative feed-back loops connecting said respective control terminals to said secondary winding at points having opposite polarity from the points at which positive feed-back loops are connected for limiting the maximum conduction of said switch means, each negative feed-back loop means comprising selectively uni-directional conductive means poled to prevent conduction in said loop until a predetermined voltage of appropriate polarity is exceeded across said conductive means, and means for placing said switch means alternately in their non-conductive states as a substantially linear function of time.

8. Apparatus for converting direct current from a power source to alternating current, said apparatus comprising in combination:

transformer means, first amplifier switch means having input, output and control terminals, second amplifier switch means having input, output, and control terminals, means for connecting said power source between an intermediate tap on the primary winding of said transformer means and both said input terminals, means connecting said output terminals across said primary winding, means constituting a pair of positive feed-back loops connecting the respective control terminals to points on the secondary winding of said transformer means, means constituting a pair of negative feed-back loops connecting said respective control terminals to points on said secondary winding which are opposite in polarity to the points at which said positive feed-back loops are connected, each negative feed-back loop means comprising selectively uni-directional conductive means poled to prevent conduction in said loop until a predetermined voltage of appropriate polarity is exceeded across said conductive means, means constituting a third loop including in series a first resistance, a Shockley diode, a second resistance, and a first capacitance parallel thereto, said third loop being connected to said input terminals through a second capacitance and a diode parallel to the latter, said diode being poled to prevent a reverse bias across said Shockley diode, said third loop connecting said control terminal of said first amplifier switch means to a point adjacent to said opposite point of said secondary winding to which the respective negative feed-back loop connected to the control terminal of said first amplifier switch means is connected, and means constituting a fourth loop including in series a third resistance, a second Shockley diode, a fourth resistance, and a third capacitance parallel thereto, said fourth loop being connected to said input terminals through a fourth capacitance and another diode parallel to the latter, said other diode being poled to prevent a reverse bias across said Shockley diode, said fourth loop connecting said control terminal of said second amplifier switch means to a point adjacent to said opposite point of said secondary winding to which the respective negative feed-back loop connected to the control terminal of said second amplifier switch means is connected.

No references cited.